(12) United States Patent
Lehman

(10) Patent No.: US 12,229,812 B2
(45) Date of Patent: Feb. 18, 2025

(54) APPARATUS, SYSTEM, AND METHOD OF PROVIDING MOBILE ELECTRONIC RETAIL PURCHASES

(71) Applicant: Josh Lehman, Las Vegas, NV (US)

(72) Inventor: Josh Lehman, Las Vegas, NV (US)

( * ) Notice: Subject to any disclaimer, the term of this patent is extended or adjusted under 35 U.S.C. 154(b) by 0 days.

(21) Appl. No.: 18/132,334

(22) Filed: Apr. 7, 2023

(65) Prior Publication Data

US 2024/0303704 A1 Sep. 12, 2024

Related U.S. Application Data

(63) Continuation of application No. 16/426,703, filed on May 30, 2019, now abandoned.
(Continued)

(51) Int. Cl.

| | |
|---|---|
| *G06Q 30/0601* | (2023.01) |
| *G06F 16/583* | (2019.01) |
| *G06T 7/00* | (2017.01) |
| *G06V 10/20* | (2022.01) |
| *G06V 20/20* | (2022.01) |
| *G06V 20/40* | (2022.01) |
| *H04N 23/45* | (2023.01) |
| *G06F 3/0482* | (2013.01) |

(52) U.S. Cl.
CPC ....... *G06Q 30/0613* (2013.01); *G06F 16/583* (2019.01); *G06Q 30/0627* (2013.01); *G06T 7/97* (2017.01); *G06V 10/255* (2022.01); *G06V 20/20* (2022.01); *G06V 20/41* (2022.01); *H04N 23/45* (2023.01); *G06F 3/0482* (2013.01)

(58) Field of Classification Search
None
See application file for complete search history.

(56) References Cited

U.S. PATENT DOCUMENTS 9,652,838 B1 * 5/2017 Manmatha ............. G06T 7/136
10,248,991 B1 * 4/2019 Cheung ............. G06Q 30/0643
(Continued)

OTHER PUBLICATIONS

"CamFi Matrix Time software makes it easy to shoot the bullet time effect" (published Jul. 14, 2017 by Brittany Hillen) https://www.dpreview.com/news/3910273469/camfi-matrix-time-software-makes-it-easy-to-shoot-the-bullet-time-effect.*
(Continued)

*Primary Examiner* — Rinna Yi
(74) *Attorney, Agent, or Firm* — Riverside Law LLP

(57) ABSTRACT

An apparatus, system and method for an object-recognizing retail purchase system. The apparatus, system and method may include an automatically adjustable camera rig comprising a plurality of movable cameras, wherein the plurality of movable cameras are automatically moved by a camera control platform according to characteristics of an object within a view field of the plurality of movable cameras; a first input for receiving images from the automatically adjustable camera rig; and a second input for receiving a plurality of scraped network images regarding a plurality of purchasable objects. Additionally included may be a first computing memory for storing an object profile for each of the plurality of purchasable objects, wherein each of the object profiles comprises at least data from the first input regarding the object within the field of view and data from the second input; and a purchasing platform at least partially present on a mobile device.

18 Claims, 11 Drawing Sheets

Related U.S. Application Data

(60) Provisional application No. 62/677,895, filed on May 30, 2018.

(56) References Cited

U.S. PATENT DOCUMENTS

| | | | | |
|---|---|---|---|---|
| 2011/0106808 A1* | 5/2011 | Hersans | ............ | G06F 16/90328 |
| | | | | 707/E17.09 |
| 2013/0251273 A1* | 9/2013 | Westphal | ............ | G06Q 30/0601 |
| | | | | 382/218 |
| 2017/0316517 A1* | 11/2017 | Shunock | ............... | H04L 63/101 |
| 2018/0341907 A1* | 11/2018 | Tucker | ................ | H04M 1/0264 |

OTHER PUBLICATIONS

"CamFind visual search app for iPhone and Android now features a social network" (published on Apr. 16, 2015) https://thenextweb.com/news/camfind-visual-search-app-for-iphone-and-android-now-features-a-social-network.*

* cited by examiner

```
//: Get Average Heigh of each object 3D in world space
fileprivate func getAverageHeight(_vectors : [SCNVector3], _ indeces : [Int]) -> Float {
var height : Float = 0.0
var index = 0
for count in 0..<indeces.count{
var newHeight = abs(vectors[index].y - vectors[indeces[count] - 1] - 1].y)
height += newHeight
print("Height:\(newHeight)")
index = (indeces[count])
}
return height/Float(indeces.count)
//: Get Average Length--Currently is length
of bounding box
fileprivate func getAverageLength(_ vectors : [SCNVector3], _ indeces : [Int]) -> Float {
var length : Float = 0.0
var index = 0
for count in (indeces[indeces.count - 1]) .. < vectors.count{
var newLength = abs(vectors[index].x - vectors[count].x)
print("Length: \(newLength)")
length += newLength
index +=1
}
return length / Float(index)
}
//: - Iterate through all points to determine where length begins.
fileprivate func detectJump(_coords: [Float])-> [Int]{
if coords.count < 2{
return[]
}
print(coords)
var indeces = [Int]()
for count in 0..<coords.count - 1{
if coords[count + 1] > coords[count]{
indeces.append(count+1)
}
}
print(indeces)
return indeces
}
```

FIG.4

APPARATUS, SYSTEM, AND METHOD OF PROVIDING MOBILE ELECTRONIC RETAIL PURCHASES

CROSS-REFERENCE TO RELATED APPLICATION

This application is a Continuation application based on U.S. application Ser. No. 16/426,703, filed May 30, 2019, which claims priority to U.S. Provisional Application No. 62/677,895 filed May 30, 2018, the entirety of which is incorporated by reference herein.

BACKGROUND

Field of the Disclosure

The disclosure relates generally to electronic commerce, and, more particularly, to an apparatus, system, and method of providing mobile electronic retail purchases.

Background of the Disclosure

It is highly desirable in the modern economy that object recognition, such as using a mobile device, be available for retail mobile applications. That is, there is a need to enable a mobile device user to capture a product image, have that image be recognized by a retail mobile application, and have the correct product reflected in the picture taken by the user be offered to the user for purchase.

More particularly, the global economy is, at present, moving ever increasingly away from so-called "brick and mortar" purchases to online purchases. However, online purchases are limited at present to only those products that a prospective purchaser can find online. That is, a user must know that a retailer has a particular product available, such as via a Google search, a visit to a retailer website, or a search through a retailer application, to discern whether a retailer has a particular product available. Of course, the need for this level of affirmative user interaction may cost a retailer a significant number of sales, at least in that users will typically purchase an item, particularly a relatively inexpensive fungible item, from the first place at which the user finds the item available online.

To accurately create image recognition models, such as to provide information on a product to a prospective customer on a mobile device, many images of the product are needed from different angles. The current industry process for image collection to create machine learning datasets is simple image scraping. Scraping is a process of extracting large amounts of information from a website or websites. The downloaded content may include text, images, full HTMLs, or combinations thereof.

Unfortunately, the approach is limited, because the user does not have control over which images are available, or the quality of those images. That is, no control is available over a number of factors, including: image quality, lighting conditions, angles, environments where images were taken. Further, products that are newly released may do not have enough (or any) images available online to allow for development of a product recognition model. All of the foregoing results in subpar models with lower than expected prediction results.

Therefore, the need exists for an apparatus, system and method to enable a prospective purchaser to understand, with minimal effort by the user, the availability of a product from a particular retailer, such as wherein the availability information includes the pricing and product data from that retailer.

SUMMARY OF THE DISCLOSURE

The embodiments are and include at least an apparatus, system and method for an object-recognizing retail purchase system. The apparatus, system and method may include an automatically adjustable camera rig comprising a plurality of movable cameras, wherein the plurality of movable cameras are automatically moved by a camera control platform according to characteristics of an object within a view field of the plurality of movable cameras; a first input for receiving images from the automatically adjustable camera rig; and a second input for receiving a plurality of scraped network images regarding a plurality of purchasable objects. Additionally included may be a first computing memory for storing an object profile for each of the plurality of purchasable objects, wherein each of the object profiles comprises at least data from the first input regarding the object within the field of view and data from the second input; and a purchasing platform at least partially present on a mobile device and comprising at least one computer processor having resident thereon non-transitory computing code.

The purchasing platform causes to be performed the steps of: receiving an image of a viewed object within a view field of a mobile device camera of the mobile device; gray-scaling the image of the viewed object; and comparing the gray-scaled image to ones of the object profiles until a matched product is obtained. A purchase link suitable to enable a purchase of the matched product from at least one third party is then provided.

Thus, the embodiments provide an apparatus, system and method to enable a prospective purchaser to understand, with minimal effort by the user, the availability of a product from a particular retailer, such as wherein the availability information includes the pricing and product data from that retailer.

BRIEF DESCRIPTION OF THE DRAWINGS

The disclosure is illustrated by way of example and not limitation in the accompanying drawings, in which like references may indicate similar elements, and in which:

FIG. 4 is an illustration of an aspect of the embodiments.

DETAILED DESCRIPTION

Figure 1:
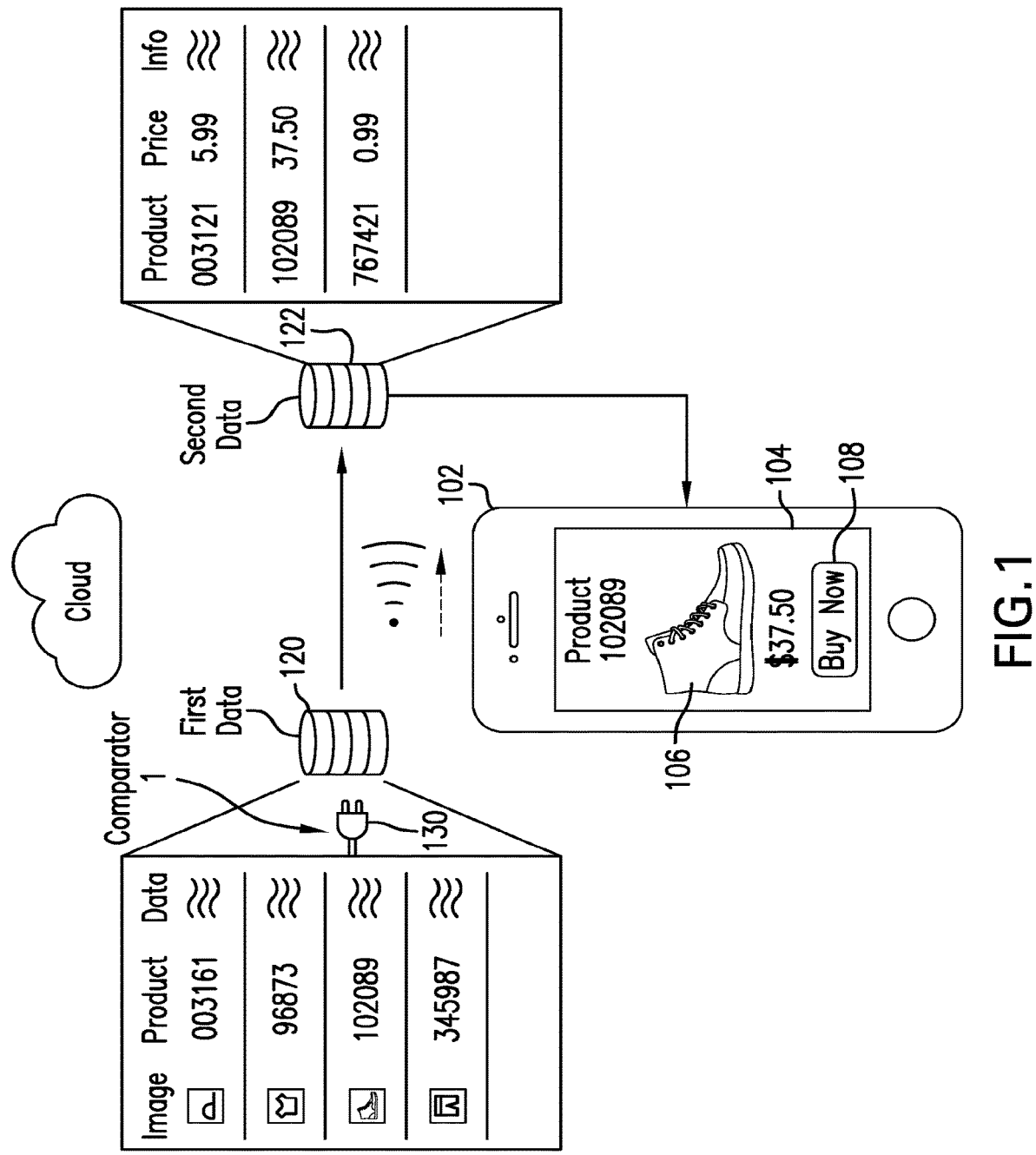
FIG. 1 is an illustration of an aspect of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform, transceive and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

As mentioned above, it is highly desirable that object recognition, such as using a mobile device 102, be available for retail mobile applications 104. The mobile device should thus enable a user to capture a product image 106, have that image be recognized by a retail mobile application 104, and have the correct product, as reflected in the picture taken by the user, offered to the user for purchase 108, such as from one retailer providing an "app" or from multiple retailers to allow for comparison shopping.

Thereby, the embodiments enable collecting and processing product images to be used for image classification and object recognition, such as in retail mobile applications. More specifically, the disclosed solution provides control as to how the images are created, resulting in better prediction results. Parameters may be adjusted to yield exceptional results, particularly for new products.

Further, for scraped or new images, automated validation scripts may be used to compare prediction results to previously created models, thereby enabling a learning model that provides continuously improving predictions unknown with prior image scraping techniques. Accordingly, the embodiments yield datasets in a way that is scalable and which yields optimal prediction results.

Simply put, to accurately create image recognition models, many images of the product are needed from different angles. To the extent sufficient images are unavailable online to enable the disclosed modeling to solve this problem, the disclosed apparatus may take numerous pictures per product by rotating the product 360° on a rotating disk with cameras pointed at it from varying vertical viewpoints.

As a threshold issue, at least two parallel data stores 120, 122 may be present to enable the aforementioned embodiments. The first data store 120 comprises a collection of product images matched to digital data related to the product pictured, as compared and assessed by a comparator 130, such as a software or firmware comparator. That is, the first data store comprises product recognition and consequent data associated with the recognized product. The second data store 122 comprises purchase information/sale information related to each product recognizable via the first data store.

As will be appreciated by the skilled artisan, the first data store may be unique to each or a subset of product sellers, or may be available via a so-called "white label" to one or many product sellers, such as in a cloud-based availability in accordance with payment of a subscription fee, by way of non-limiting example. The second data store may, in preferred embodiments, be unique to each seller of goods. That is, the second data store may be unique in each offered retail application, such as wherein each seller sets pricing, maximums/minimums, and/or availability information for the products in the first data store that are available from that seller. The first and second data store 120, 122 are illustrated in the example of FIG. 1.

As a threshold issue, the image recognition model or models that provide the information that allows for matching of a pictured product to the first data store necessarily requires one or more images of any product that is to comprise the first data store. By way of example, multiple images of a product may be necessary from different angles, such as to account for the fact that a user may capture an image of the object at one or more "off" angles from a "head-on" image. Thus, an image recognition model may be generated using at least two methods: in the first method, many images may be taken of each product desired for inclusion in the first data store; in a second methodology, existing pictures of a product may be "scraped" from one or multiple locations, such as locations that are publicly or privately available, wherein the scraped images may be combined into a unique image recognition model for each product to be included in the first data store.

In the first method, many images, such as tens, hundreds, or thousands of images per product at various angles, such as up to 360° vertically and 360° horizontally, may be captured. Several challenges exist in this regard. A robust camera stand must take pictures of products from different angles of varying size. The camera(s) and stand must be automated, and must be controllable locally or remotely, such as via a central web application. Thus, the local interface may include local processing to execute local or remote instructions on the local hardware.

Automation may include focusing cameras properly and in the correct direction for different size objects without needing to continually manually adjust the stand and cameras. The application should include quality control comparisons to ensure that the images are of the correct quality and enough variety is obtained for the creation of a robust model.

Figure 2A:
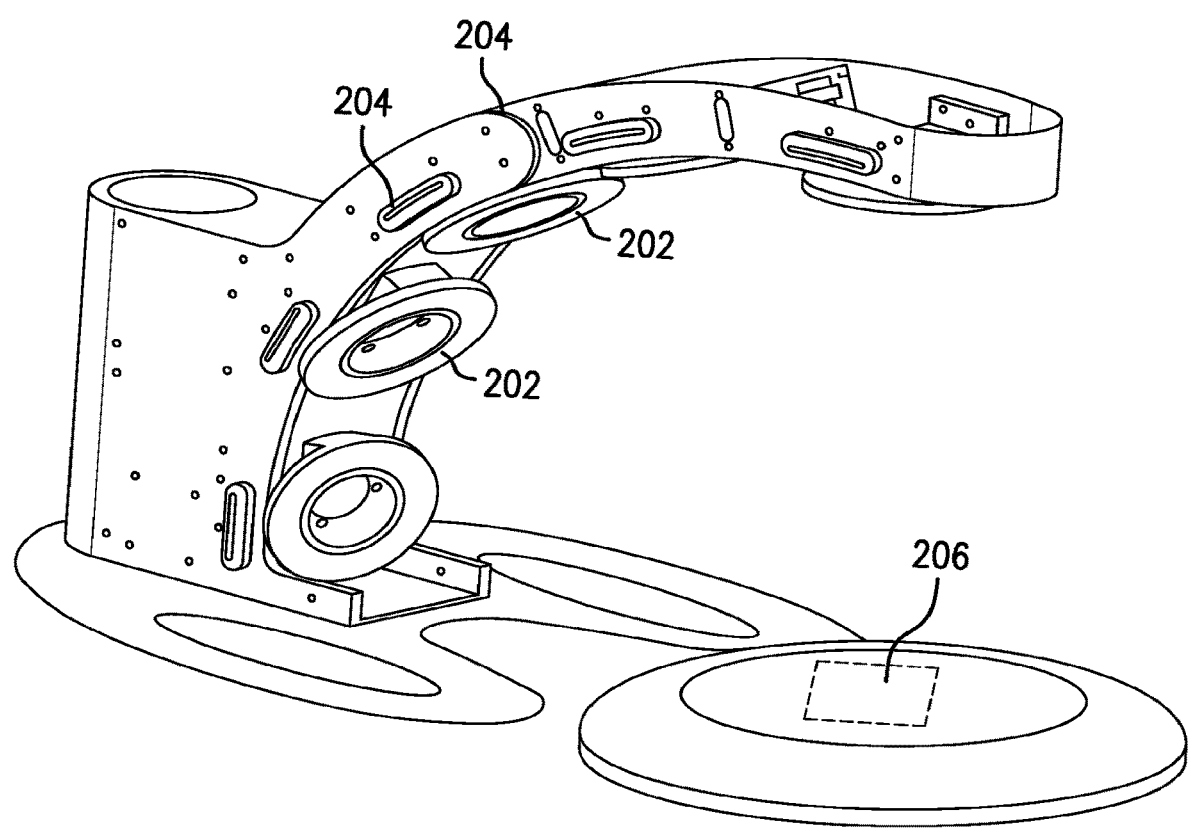
FIGS. 2A, B and C are illustrations of aspects of the embodiments.
Figure 2B:
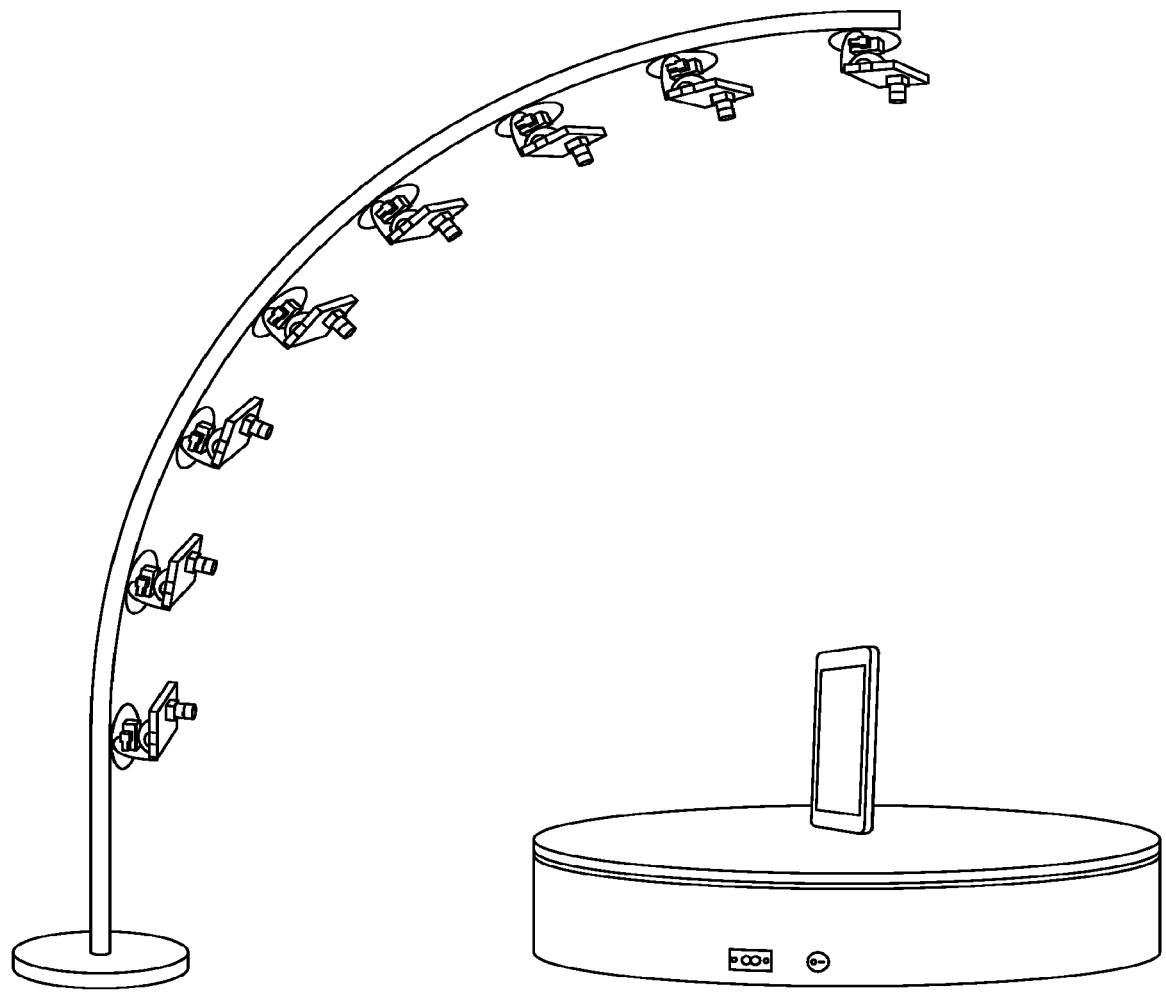
Figure 2C:
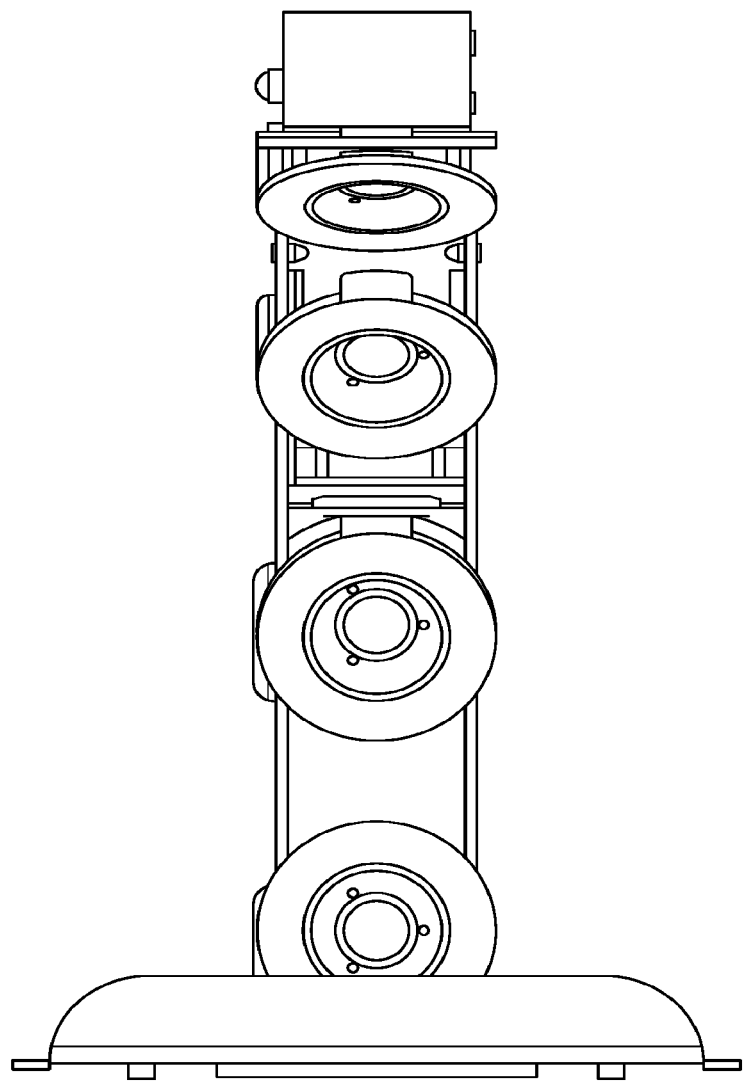

In order to provide for the foregoing, FIGS. 2A, 2B and 2C illustrate an image rig that allows for pictures of various products of varying size and multiple angles from a camera. Of note, the camera and rig illustrated may be locally controlled, either automatically or manually, or may be controlled remotely, such as via the aforementioned web or mobile application provided uniquely to each retailer, or administratively controlled by a provider of a subscription service which enables access to images on a per product basis.

Of note, the camera(s) 202 illustrated may be manually or automatically focused/moved 204 in the correct direction or directions to account for different size objects 206 nearer to and farther from the camera(s), and this focus may be controlled locally or remotely as discussed throughout. Moreover, the illustrated image collection model may include a quality control aspect or application, as referenced throughout, to ensure that the images collected are of an acceptable quality to provide for machine learning that creates the image recognition models discussed throughout.

Figure 3:
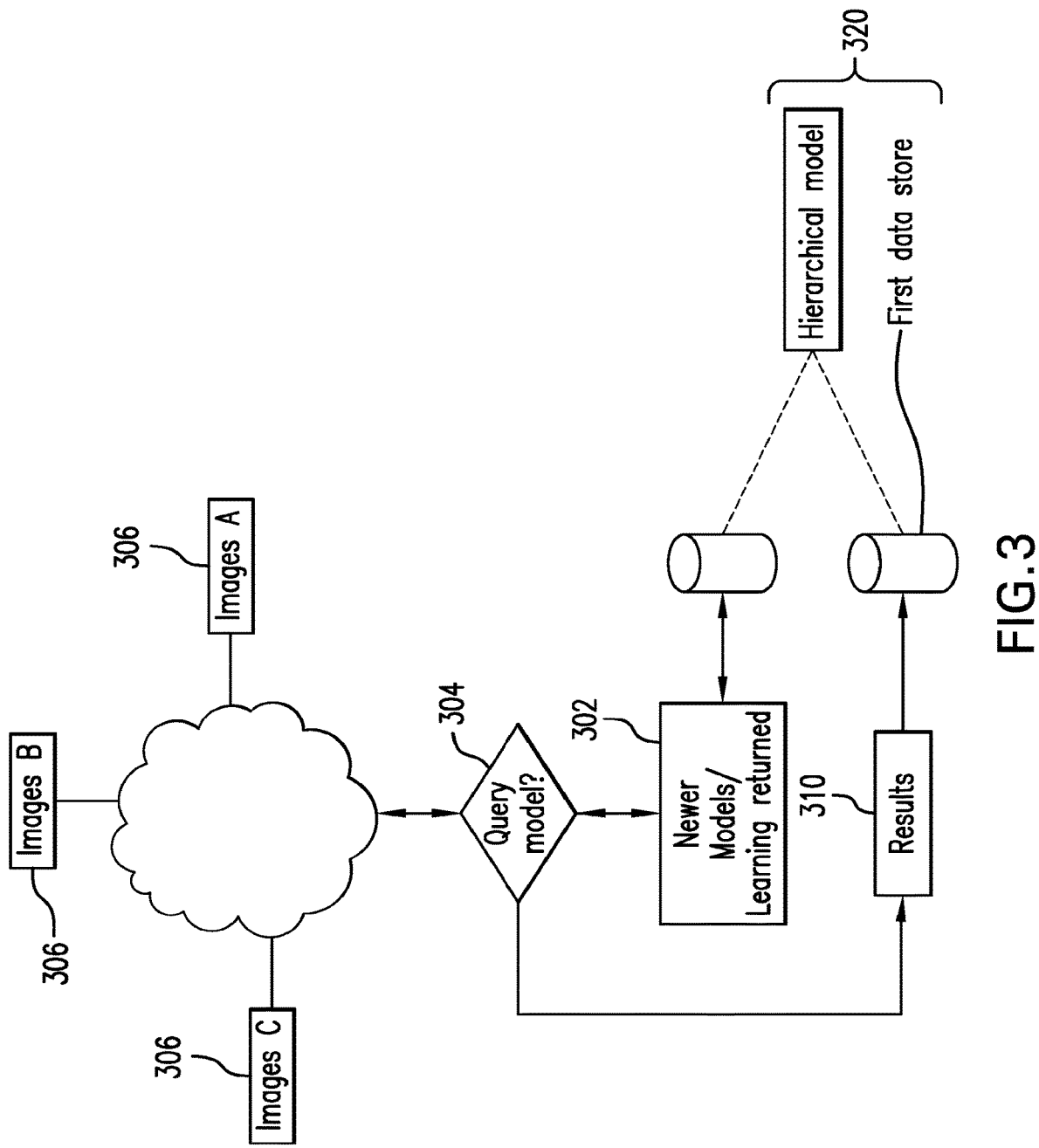
FIG. 3 is an illustration of an aspect of the embodiments.

Alternatively, a plurality of images may be scraped from available sources, such as Google images, Amazon, available search engines, and the like, to provide a training data set to enable machine learning. By way of example, a convolutional neural model 302 may execute upon a Google images query 304. This is illustrated in the example of FIG. 3. In such an instance, images and/or image URLs 306 may be captured, and relevant images marked and captured/returned, either manually or using a code-based object recognition, such as to mark all images related to a particular searched product as results 310. It goes without saying that quality control, as referenced above, may be applied to images automatically, such as to ensure image files are not corrupted and are suitable for opening by a machine learning model.

In short, images may be uploaded, such as from scraping or from the automated capture system, and grouped into cloud storage containers with the appropriate product references responsive to the searches/groupings assessed. As such, the images may be categorically and hierarchically archived 320, such as in a cloud storage facility, for access once needed in the future. This reduces the cost of long term storage for the plethora of images.

Thereafter, machine learning may be applied to the relevant data set in order to "learn" suitable images for comparison to a given individual product. For example, a cloud batch process may be triggered to create the models from the captured/stored images, such as in formats ready for use on iOS and Android devices. Of course, it will be understood that the machine learning discussed herein may be used in conjunction with one or more image-building applications, such that unavailable images, such as at particular angles or in particular lighting, may be extrapolated by the machine learning model based on "approved" images of a particular product.

In either of the foregoing cases, once a relevant image collection is created for a given product, that product and its corresponding images may be hierarchically categorized, such as into a limited number of available categories into which products may be placed, either manually or automatically. Thereby, the disclosed object recognition model that employs the image collection may engage in refined processing, at least in that the machine learning model enables the recognition of at least one or more broad categories into which an imaged product may be properly placed, such that further drill downs to the images of the product for comparison by the object recognition model may be limited based on a predefined rule set in the object recognition model. By way of example, it may be evident from a captured image that the image product is a kitchen appliance. Thereafter, the machine learning model may limit the available drill downs for the object recognition model only to those images that clearly illustrate kitchen appliances. That is, the object recognition model may be enabled to drill down to ultimately conclude that the image is of a particular type of toaster, but may not be enabled by the initial machine learning to drill down into a hierarchy of products that comprise mufflers for automobiles.

Needless to say, both the object categorization and the object recognition algorithms discussed herein throughout may necessitate training of the machine learning. Byway of particular example, after generating enough images in each product to create a viable product-specific object recognition model, a training algorithm may be run to create, for example, both a CoreML (iPhone) and Python compatible model.

In the foregoing instance, the Python compatible model may be used primarily for testing against previous iterations to determine how to proceed with generating new models. Further, as the last step of the API, the CoreML model may be uploaded to an AWS bucket so that users of the iPhone app have the latest products available for scanning.

The embodiments provide an accurate visual recognition machine learning model that provides optimal accuracy while keeping the model size and computer processing times to a minimum, as discussed throughout. It is preferable, to allow for execution of retail applications as discussed throughout, that the employed models are compatible with native visual recognition libraries on iOS and Android devices.

More particularly, an object recognition algorithm used in the disclosure may gray scale the received image, thereby decreasing the size of the image. The algorithm then creates numerous boxes which scan the image for haar-like features and patterns detected in the received pixels by assessing darker versus lighter color. After many images of the same object have been observed as referenced above, common haar-like features may thereafter be recognized as attributable to that object. Accordingly, an inputted photo may be scanned and its haar-like features used to signal a match with the closest matching features of all the objects in the model.

Of course, rather than matching across all models, size, shape, and the like may first be used by the model to assess a category of item initially, whereafter the item in the picture may be matched by category to thus limit processing needed. For example, the iOS ARKit allows for calculation of the dimensions of a product. That is, utilizing the mobile device camera and native capabilities, the statistics of a detected object may be returned. A plurality of position vectors may thereby be extracted and compared with other vectors, such as those of the stored product(s).

Although more processing intensive dependent upon the level of detail, such an analysis may account for even small percentage issues as follows. The average length and width may be calculated by finding every length and width (whole width and height) and dividing by the number of lengths and widths. Trigonometric features, such as the tangent or arctangent, may also be used to account for the displaced depth value to provide a more accurate reading of object size. Once depth displacement is accounted for, the Pythagorean theorem may be used to determine a final width and height of the object, for example.

Further and by way of example, the height component may additionally be unitized to form a unit vector in the y direction, and the magnitude of the width component may get divided by the previous height vector magnitude to form a ratio between height and width, so that the same object at a different distance will produce the same result. The new width ratio value may then be compared to the stored width ratio values (calculated actual values of objects) and the closest match may be returned.

The foregoing analyses is provided by way of example, and as such other techniques, such as bounding box detection, may be implemented without departing from the spirit of the disclosure. Additionally and needless to say, the foregoing refined analyses may also be used to delineate between highly similar products.

Moreover, the created models may run locally on native retail applications, i.e., completely offline and with no server costs. Alternatively, the models may run partially or fully as thin client applications with only the user-interface natively provided.

Once the object recognition model is enabled by the machine learning and image collection discussed herein, the object recognition model may operate to recognize the object in an image while engaging in optimally minimal levels of processing. For example, an object recognition model may include a rule set that initially seeks only key features, such as edges, contours, colors, the presence of controls, the presence of electronic readouts, or the like in order to recognize those features and initially categorize the product in the image. These common features may be recognized and attributed to the object by the object recognition model such that an initial category and available drill downs are attributed to the product in the image. Upon drill down, additional matching features may be discerned by the object recognition model such that the closest matching features of the objects in the model are paired with the imaged object.

Of course, the skilled artisan will appreciate in light of the discussion herein that the image recognition model may encounter difficulty in differentiating between very similar products. In the event of such highly similar products, the object recognition model may, such as only in such circumstances, be enabled to engage in much more significant processing. For example, the object image may be assigned a large number of positional vectors, including length, width, height, depth, density, angles, and any other aspects that may be assessed in an image, including trigonometric features related to the imaged object, by way of non-limiting example. All and/or each of these refined vectors may be compared to these refined vectors in the image store of the object recognition model. It will be appreciated that, in preferred embodiments, this level of refined vector comparison should be avoided, to the extent possible, in order to minimize and expedite processing of a captured image. FIG. 4 illustrates a processing system executing code to, in part, perform a refined vector comparison as discussed above.

It will be appreciated that limited, some, or all aspects of the above comparisons may be locally or remotely associated with a particular retail application. By way of example, only the broad categorization aspect of the object recognition model disclosed may be locally provided in a retail application on a mobile device. Thereafter, once provided with the category, a user may be enabled to perform a manual drill down to assess the imaged product, so that extensive processing and/or local storage of the refined vector analysis discussed above may be avoided. Similarly, only certain categories of products for the first data store may be available in local memory. Thus, for example, automobile tire information for the first data store may be stored locally, at least because of the comparatively limited number of tire manufacturers and types of tires that such data storage must account for. However, other product types for the first data store, such as chairs, which have a large number of manufacturers and an even larger number of types and sizes, may be available only remotely.

Figure 5:
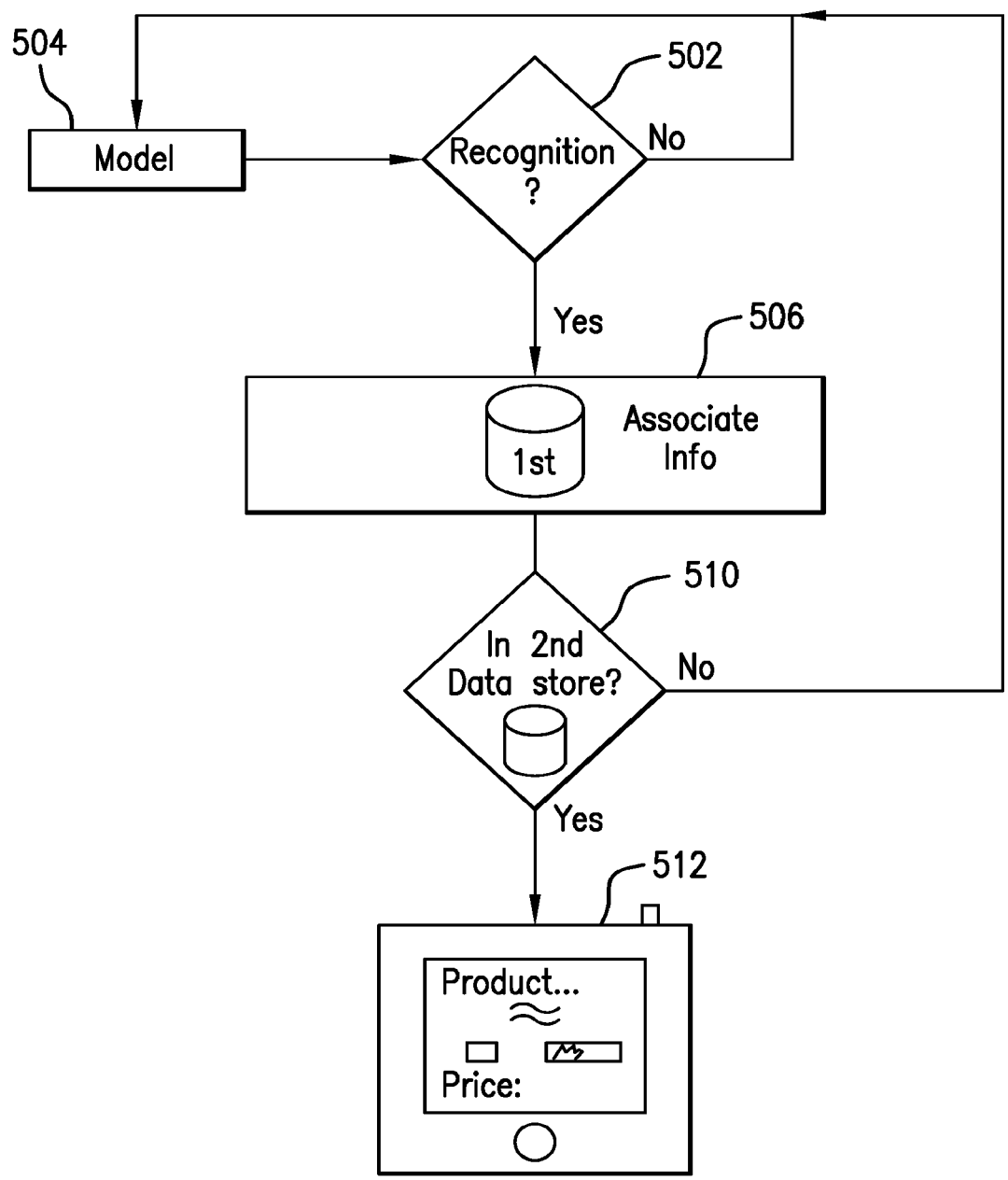
FIG. 5 is an illustration of an aspect of the embodiments.
Figure 7:
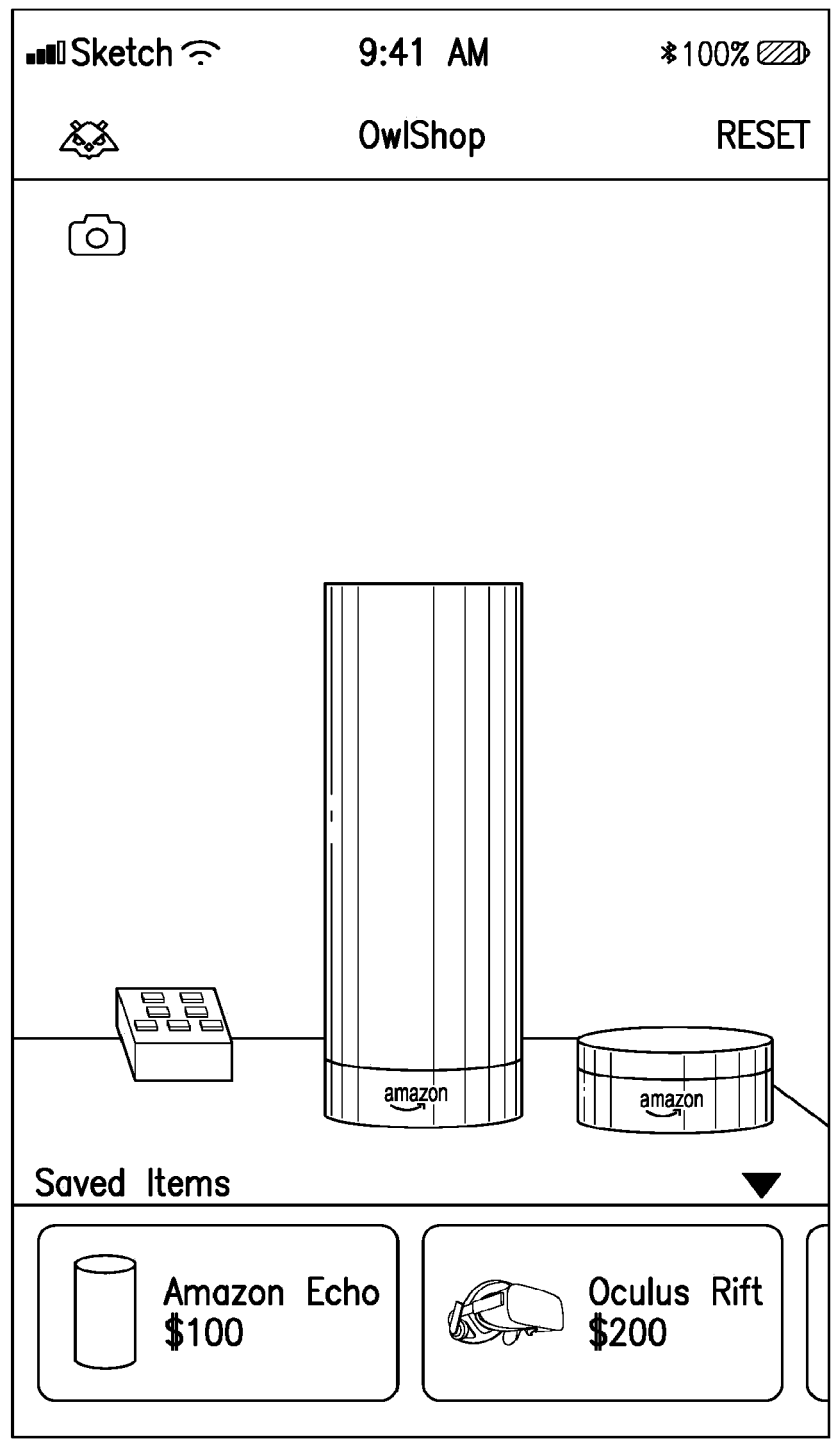
FIG. 7 illustrates aspects of the embodiments.

As illustrated in FIG. 5, once an object in an image is recognized 502 by the object recognition model 504, the information from the first data store 506 is associated with that object 506, and, to the extent the second data store indicates that product is for sale from the relevant seller 510, that product may be provided to the user in an application, such as on a mobile device, as available for purchase by the user 512 (see also, e.g., FIG. 7). It will be understood in light of the discussion herein that the application referenced may have available to it one or more APIs that allow for variations and variable uses of the aspects discussed herein throughout. For example, the API may allow for an application available on multiple platforms, such as android and iOS, a selection of categories of products to be made available for purchase through the application, the level of user interaction available to the user, such as whether the user is enabled to drill down manually through the hierarchical menu discussed herein, is to receive a presentation of a limited number of products to select from as the one imaged by the user, or if the user is to receive only the "best guess" product provided by the disclosed embodiments, and so on. It will also be understood that the API may allow for selection by the application provider of whether the user must affirmatively image from within the application in order to be provided with a purchasable product, or can simply point the camera and at an object and have the application automatically capture the image and discern the product to be provided for purchase.

Figure 8A:
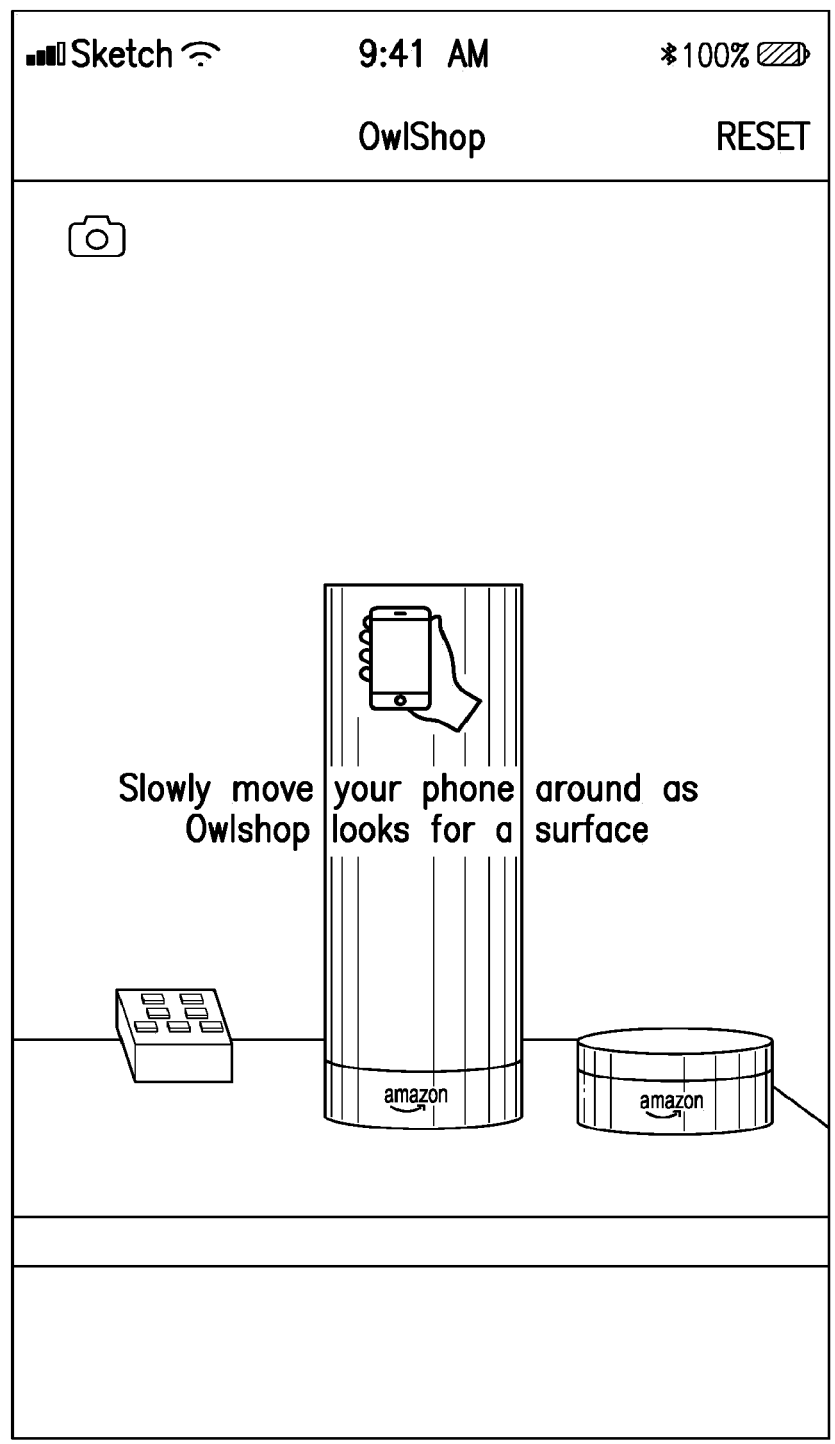
FIGS. 8A and 8B illustrate aspects of the embodiments.
Figure 8B:
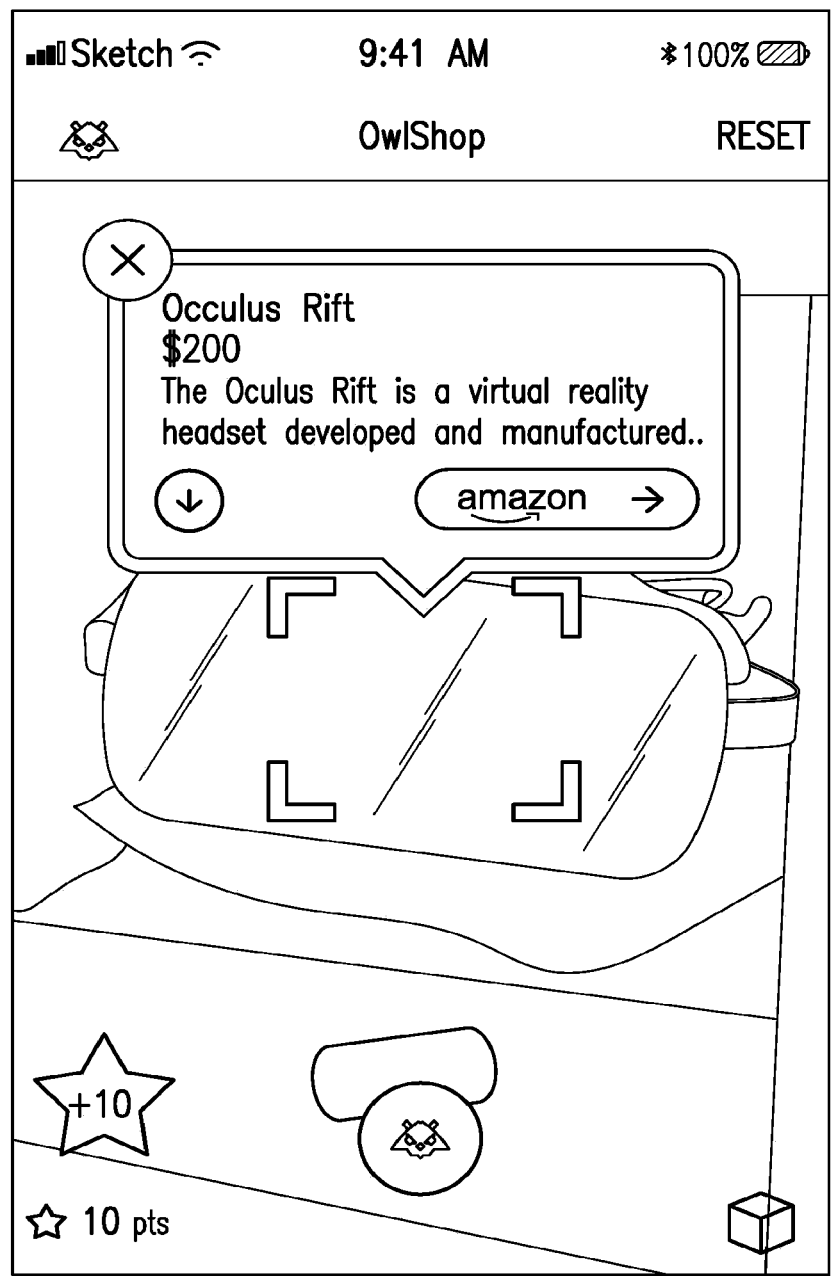

More specifically, the API may enable a native iOS Application. The native iOS application may take input from a live video feed, and may run each frame through the disclosed object modeling, resulting in a prediction of what object is recognized in the image. This process may be performed locally on the device, and thus may be available for offline use. Results may be rendered in the UI in an augmented reality (AR) call-out label, for example, which may appear above each product in a 3D presentation space. A link may embedded in the call-out, which, when activated, may direct a user to a website where she can purchase the product. The foregoing is illustrated by way of example in FIGS. 8A and 8B.

Figure 6:
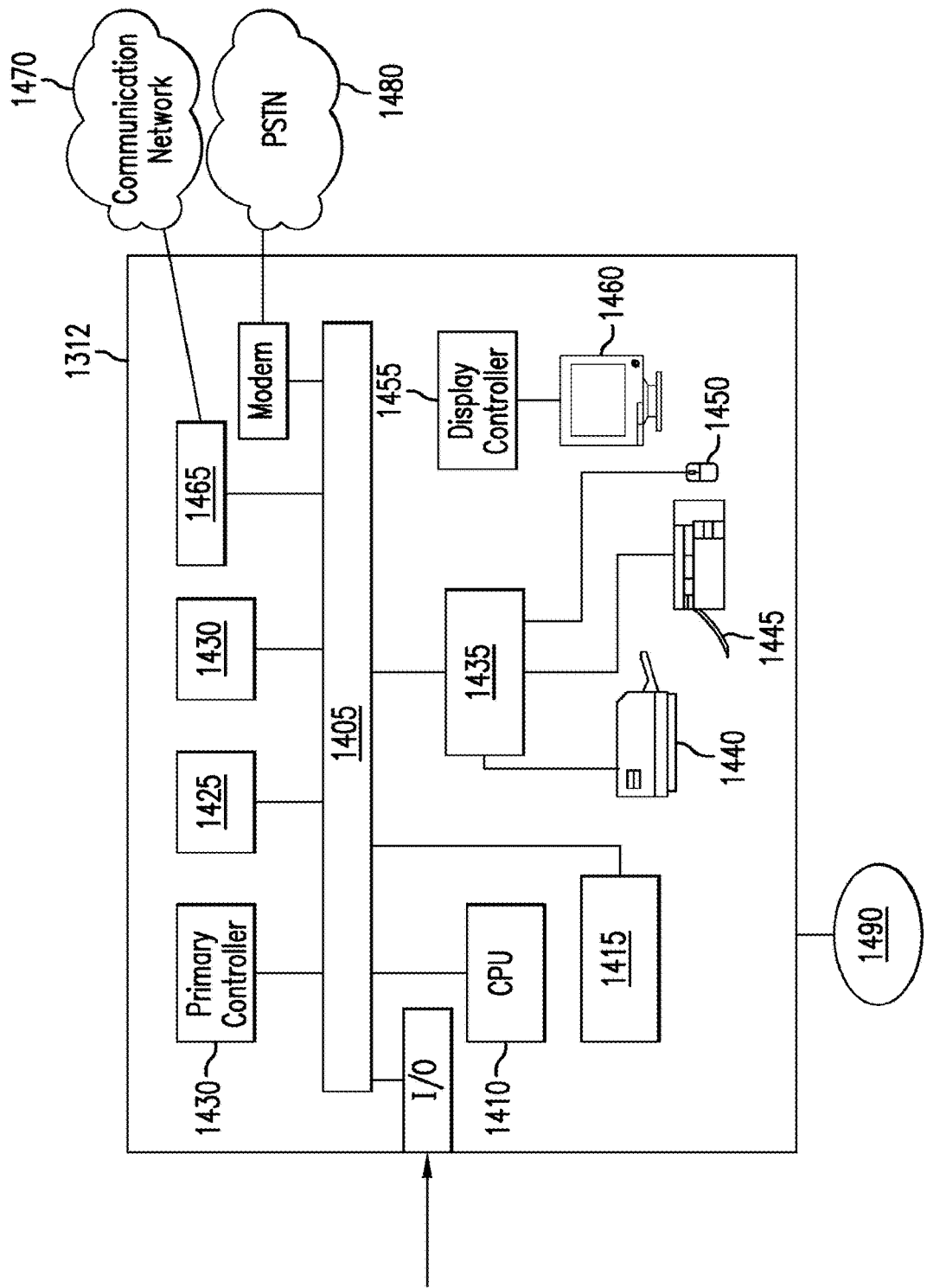
FIG. 6 is an illustration of a processing system.

FIG. 6 depicts an exemplary computer processing system 1312 for use in association with the embodiments, by way of non-limiting example. Processing system 1312 is capable of executing software, such as an operating system (OS), applications, user interface, and/or one or more other computing algorithms/applications 1490, such as the recipes, models, programs and subprograms discussed herein. The operation of exemplary processing system 1312 is controlled primarily by these computer readable instructions/code 1490, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 to cause system 1312 to perform the disclosed operations, comparisons and calculations. In many known computer servers, workstations, personal computers, and the like, CPU 1410 is implemented in an integrated circuit called a processor.

It is appreciated that, although exemplary processing system 1312 is shown to comprise a single CPU 1410, such description is merely illustrative, as processing system 1312 may comprise a plurality of CPUs 1410. Additionally, system 1312 may exploit the resources of remote CPUs (not shown) through communications network 1470 or some other data communications means 1480, as discussed throughout.

In operation, CPU 1410 fetches, decodes, and executes instructions from a computer readable storage medium, such as HDD 1415. Such instructions may be included in software 1490. Information, such as computer instructions and other computer readable data, is transferred between components of system 1312 via the system's main data-transfer path. The main data-transfer path may use a system bus architecture 1405, although other computer architectures (not shown) can be used.

Memory devices coupled to system bus 1405 may include random access memory (RAM) 1425 and/or read only memory (ROM) 1430, by way of example. Such memories include circuitry that allows information to be stored and retrieved. ROMs 1430 generally contain stored data that cannot be modified. Data stored in RAM 1425 can be read or changed by CPU 1410 or other hardware devices. Access to RAM 1425 and/or ROM 1430 may be controlled by memory controller 1420.

In addition, processing system 1312 may contain peripheral communications controller and bus 1435, which is responsible for communicating instructions from CPU 1410 to, and/or receiving data from, peripherals, such as peripherals 1440, 1445, and 1450, which may include printers, keyboards, and/or the operator interaction elements on a mobile device as discussed herein throughout. An example of a peripheral bus is the Peripheral Component Interconnect (PCI) bus that is well known in the pertinent art.

Operator display 1460, which is controlled by display controller 1455, may be used to display visual output and/or presentation data generated by or at the request of processing system 1312, such as responsive to operation of the aforementioned computing programs/applications 1490. Such visual output may include text, graphics, animated graphics, and/or video, for example. Display 1460 may be implemented with a CRT-based video display, an LCD or LED-based display, a gas plasma-based flat-panel display, a touch-panel display, or the like. Display controller 1455 includes electronic components required to generate a video signal that is sent to display 1460.

Further, processing system 1312 may contain network adapter 1465 which may be used to couple to external communication network 1470, which may include or provide access to the Internet, an intranet, an extranet, or the like. Communications network 1470 may provide access for processing system 1312 with means of communicating and transferring software and information electronically. Additionally, communications network 1470 may provide for distributed processing, which involves several computers and the sharing of workloads or cooperative efforts in performing a task, as discussed above. Network adaptor 1465 may communicate to and from network 1470 using any available wired or wireless technologies. Such technologies may include, by way of non-limiting example, cellular, Wi-Fi, Bluetooth, infrared, or the like.

More particularly, and with reference to FIGS. 5 and 6, the embodiments may provide a cloud environment, such as with an accompanying web dashboard, to control the camera(s), review scan results, mody object recognition, and provide any "back end" for a retail or white label "app." The dashboard may include private, password protection, and administrator controls.

The interface may enable input, categorization, and control of product data. The interface may interact with the cloud infrastructure to create, rename and delete image storage containers. The interface may oversee the automated batch processes for the creation of the machine learning model.

As referenced throughout, the computing system of FIG. 6 may enable the provision of the disclosed API. The API may include an image processing pipeline which, after completing the recording of a video, such as via the GigE Industrial Cameras6, receive data in, for example, a C++ handled component wrapped around the GigE industrial Cameras SDK7. The data streamed through this component, with help from GStreamer8, may then be sent to a Python server for processing.

With the videos downloaded and ready to be processed, the image processing pipeline, capable of video splitting, segmentation, masking, may actuate as follows. For video splitting and to reduce the volume of images, frames may be pulled from a video on a step basis. The translation of disk rotation speed and degree separation may yield the step value.

For image segmentation, the background may be removed from the focal object by the processing. Segmenting the background from the object enables processing of the products regardless of their color. This process is thus different than masking pixel color (e.g., using a green screen), and instead uses machine learning models to predict the focal object. Using the disclosed method rather than a green screen provides a greater predictive result and automates the enrollment process.

The pipeline step provides the ability to find the bounding box of the product being scanned. For image classification, this allows cropping of the area surrounding the object, which better enables training of the classification models. For object detection, this step enables the ability to train machine learning models to look for the object in an image rather than simply identifying if an image is a product.

Masking may be performed to segment the image onto selectively chosen backgrounds. Thereby, depending on the model then under build, the processing can rotate, brighten, randomize location, resize, and blur the segmented image to produce a pool of images from which algorithms can be efficiently trained.

In sum, image classification differs from object detection, and so the input data used to create the model(s) also differs. The API may thus comprise the ability to create both, with the distinctions handled in the web dashboard.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. An object-recognizing retail purchase system, comprising:
   an automatically adjustable camera rig comprising a plurality of movable cameras, wherein the plurality of movable cameras are automatically moved by a camera control platform according to characteristics of an object within a view field of the plurality of movable cameras;
   a first input for receiving images from the automatically adjustable camera rig;
   a second input for receiving a plurality of scraped network images regarding a plurality of purchasable objects, wherein the scraped network images include new images for newly released products by using automated validation scripts;
   a first computing memory for storing an object profile for each of the plurality of purchasable objects, wherein each of the object profiles comprises at least data from the first input regarding the object within the field of view and data from the second input;
   a purchasing platform at least partially present on a mobile device and comprising at least one computer processor having resident thereon non-transitory computing code which, when executed by the at least one computing processor, causes to be performed the steps of:
   receiving an image of a viewed object within a view field of a mobile device camera of the mobile device, wherein the image of viewed object is assigned one or more vectors forming at least height and width aspect ratios;
   gray-scaling the image of the viewed object;
   comparing the gray-scaled image to ones of the object profiles until a matched product is obtained, wherein the comparing includes determining the matched product by matching stored aspect ratios to the formed at least height and width aspect ratios that are formed from the assigned one or more vectors, and the matching includes comparing a new width ratio value to the stored width ratio values and returning the closest match when the same object at a different distance produces the same result, and wherein the data to the first input comprises gray-scaling to create haar-like features and patterns detected in pixels of the received image to determine attributes associated with the viewed object that are used in the comparison until the matched product is obtained, and; and
   providing a purchase link via a graphic user interface in the mobile device suitable to enable a purchase of the matched product from at least one third party.

2. The object-recognizing retail purchase system of claim 1, wherein the camera control platform is remote from the camera rig.

3. The object-recognizing retail purchase system of claim 1, wherein the camera rig comprises a semicircular camera base, wherein the camera rig includes one or more cameras to produce one or more images each associated with the one or more vectors to create the at least height and width aspect ratios.

4. The object-recognizing retail purchase system of claim 1, wherein the third party is a retailer.

5. The object-recognizing retail purchase system of claim 1, wherein the purchase link comprises a plurality of purchase links to a plurality of third parties.

6. The object-recognizing retail purchase system of claim 1, wherein the network comprises the cloud.

7. The object-recognizing retail purchase system of claim 1, wherein the mobile device comprises a proprietary operating system.

8. The object-recognizing retail purchase system of claim 7, wherein the proprietary operating system comprises iOS.

9. The object-recognizing retail purchase system of claim 7, wherein the proprietary operating system comprises Android.

10. The object-recognizing retail purchase system of claim 1, wherein the image scraping to the second input is responsive to a manual computing search.

11. The object-recognizing retail purchase system of claim 1, wherein the purchasing platform is fully present on the mobile device.

12. The object-recognizing retail purchase system of claim 11, wherein the purchasing platform comprises an app.

13. The object-recognizing retail purchase system of claim 1, wherein the image of the viewed object of the mobile device comprises a moving image.

14. The object-recognizing retail purchase system of claim 1, wherein the image of the viewed object of the mobile device comprises a single view.

15. The object-recognizing retail purchase system of claim 1, wherein the image of the viewed object is directed manually.

16. The object-recognizing retail purchase system of claim 1, wherein the object profiles are stored and accessed categorically.

17. The object-recognizing retail purchase system of claim 16, wherein the categories are manually accessible via a hierarchical menu.

18. The object-recognizing retail purchase system of claim 17, wherein the hierarchical menu comprises a drop down menu.

* * * * *